United States Patent
Lee et al.

(10) Patent No.: US 10,416,681 B2
(45) Date of Patent: Sep. 17, 2019

(54) BARCODE: GLOBAL BINARY PATTERNS FOR FAST VISUAL INFERENCE

(71) Applicant: Mitsubishi Electric Research Laboratories, Inc., Cambridge, MA (US)

(72) Inventors: Teng-Yok Lee, Cambridge, MA (US); Srikumar Ramalingam, Salt Lake City, MA (US); Yuichi Taguchi, Arlington, MA (US); Sonali Patil, Lagayette, IN (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 260 days.

(21) Appl. No.: 15/647,428

(22) Filed: Jul. 12, 2017

(65) Prior Publication Data
US 2019/0018423 A1    Jan. 17, 2019

(51) Int. Cl.
*G05D 1/02*    (2006.01)
*G06K 9/46*    (2006.01)
(Continued)

(52) U.S. Cl.
CPC ....... *G05D 1/0253* (2013.01); *G06K 9/00664* (2013.01); *G06K 9/4647* (2013.01);
(Continued)

(58) Field of Classification Search
CPC ............. G05D 1/0253; G06K 9/00664; G06K 9/6255; G06K 9/4647; G06K 7/1434; G06F 17/16; G06N 3/02
See application file for complete search history.

(56) References Cited

U.S. PATENT DOCUMENTS 6,351,566 B1 *   2/2002   Zlotnick ................ G06K 9/38
                                                                    382/237
7,062,099 B2     6/2006   Li et al.
(Continued)

FOREIGN PATENT DOCUMENTS

WO    2014130404    8/2014

OTHER PUBLICATIONS

Wang et al., "Flag: Feature-based localization between air and ground," 2017 IEEE International Conference on Robotics and Automation, May 29, 2017, pp. 3178-3184.
(Continued)

*Primary Examiner* — Mussa A Shaawat
(74) *Attorney, Agent, or Firm* — Gennadiy Vinokur; James McAleenan; Hironori Tsukamoto

(57) ABSTRACT

Systems and methods for an imaging system having a memory with a historical localization dictionary database having geo-located driving image sequences, such that each reference image is applied to a threshold to produce a binary representation. A sensor to acquire a sequence of input images of a dynamic scene. An encoder to determine, for each input image in the sequence, a histogram of each input image indicating a number of vertical edges at each bin of the input image and to threshold the histogram to produce a binary representation of the input image. A visual odometer to compare the binary representations of each input image and each reference image, by matching an input image against a reference image. Wherein the visual odometer determines a location of the input image based on a match between the input image and the reference image.

17 Claims, 9 Drawing Sheets

(51) Int. Cl.
| | |
|---|---|
| *G06K 9/62* | (2006.01) |
| *G06K 9/00* | (2006.01) |
| *G06F 17/16* | (2006.01) |
| *G06K 7/14* | (2006.01) |
| *G06N 3/02* | (2006.01) |

(52) U.S. Cl.
CPC ............ *G06K 9/6255* (2013.01); *G06F 17/16* (2013.01); *G06K 7/1434* (2013.01); *G06N 3/02* (2013.01)

(56) References Cited

U.S. PATENT DOCUMENTS

| | | | | |
|---|---|---|---|---|
| 7,957,556 | B2* | 6/2011 | Aimura | G06K 9/00805 382/103 |
| 2011/0001615 | A1* | 1/2011 | Kuoch | B60R 21/0134 340/436 |
| 2012/0269398 | A1* | 10/2012 | Fan | G06K 9/3258 382/105 |
| 2012/0308114 | A1 | 12/2012 | Othmezouri et al. | |
| 2013/0279758 | A1* | 10/2013 | Burry | G06K 9/3258 382/105 |
| 2015/0287203 | A1* | 10/2015 | Baumberg | H04N 5/232 382/103 |
| 2016/0162761 | A1* | 6/2016 | Bulan | G06K 9/00456 382/104 |
| 2016/0171328 | A1* | 6/2016 | Bulan | G06K 9/3241 382/321 |
| 2017/0364082 | A1* | 12/2017 | Taieb | G01C 21/32 |

OTHER PUBLICATIONS

Goedeme et al, "Markerless Computer Vision based Localization using Automatically generated topological maps," Jan. 1, 2004, https://lirial.kuleven.be/bitstream/123456789/157829/1/Goedeme_Nuttin_Tuytelaars_VanGool-robnav-gnss04.pdf, retrieved Apr. 4, 2018.
Lamon et al, "Deriving and matching image fingerprint sequences for mobile robot localization," Proceedings of the 2001 IEEE International Conference on Robotics and Automation, vol. 2, May 21, 2001-May 26, 2001. pp. 1604-1614.
Zhang et al., Error aware Monocular Visual Odometry using Verticle Line Pairs for Small Robots in Urban Areas, Proceedings of the Twenty Fourth AAAI Conference on Artificial Intelligence, Jul. 5, 2010.
Park et al., "Efficient use of Local Edge Histogram Descriptor," Proceedings ACM Multimedia 2000 Workshops, Nov. 4, 2000, NY, NY, ACM. pp. 51-54.
Lee, "Barcode: Global Binary Patterns for Fast Visual Inference," Jan. 1, 2017. retrieved from the internet, http://www.merl.com/publications/docs/TR2017-145.pdf, retrieved Apr. 4, 2018.
A. Canclini, M. Cesana, A.Redondi, M.Tagliasacchi, J. Ascenso, R. Cilia. "Evaluation of low-complexity visual feature detectors and descriptors." Digital Signal Processing (DSP), 2013 18th International Conference on, 1-7.
Pomerleau, D.A. (1991) Efficient Training of Artificial Neural Networks for Autonomous Navigation. In Neural Computation 3:1 pp. 88-97.
Musleh B., Martin D., de la Escalera A., Guinea D.M., Garcia-Alegre M.C. (2012) Estimation and Prediction of the Vehicle's Motion Based on Visual Odometry and Kalman Filter. In: Blanc-Talon J., Philips W., Popescu D., Scheunders P., Zemčik P. (eds) Advanced Concepts for Intelligent Vision Systems. ACIVS 2012. Lecture Notes in Computer Science, vol. 7517. Springer, Berlin, Heidelberg.
D. Robertson and R. Cipolla. An image-based system for urban navigation. In BMVC, 2004.
J. Hays and A. Efros. Im2gps: estimating geographic images from single images. In CVPR, 2008.
D. Nister and H. Stewenius. Scalable recognition with a vocabulary tree. In Computer Vision and Pattern Recognition, 2006 IEEE Computer Society Conference on. Jun. 17-22, 2006.
Hervé Jégou, Matthijs Douze, Cordelia Schmid, Patrick Perez. Aggregating local descriptors into a compact image representation. CVPR 2010—23rd IEEE Conference on Computer Vision & Pattern Recognition, Jun. 2010, San Francisco, United States. IEEE Computer Society, pp. 3304-3311, 2010.
W. Yuan and S. Ramalingam. Fast localization and tracking using event sensors. In ICRA, 2016.
A. Kendall, M. Grimes, and R. Cipolla. Posenet: A convolutional network for real-time 6-dof camera relocalization. In ICCV, 2015.
Andrew Howard, "Real-Time Stereo Visual Odometry for Autonomous Ground Vehicles." Intelligent Robots and Systems, 2008. IROS 2008. IEEE/RSJ International Conference on. Sep. 22-26, 2008.
Patil, S., Lee, T., Ramalingam, S., Taguchi, Y., and Benes, B., (2017). Barcode: Global Binary Patterns for Fast Visual Inference in International Conference on 3D Vision (3DV).

* cited by examiner

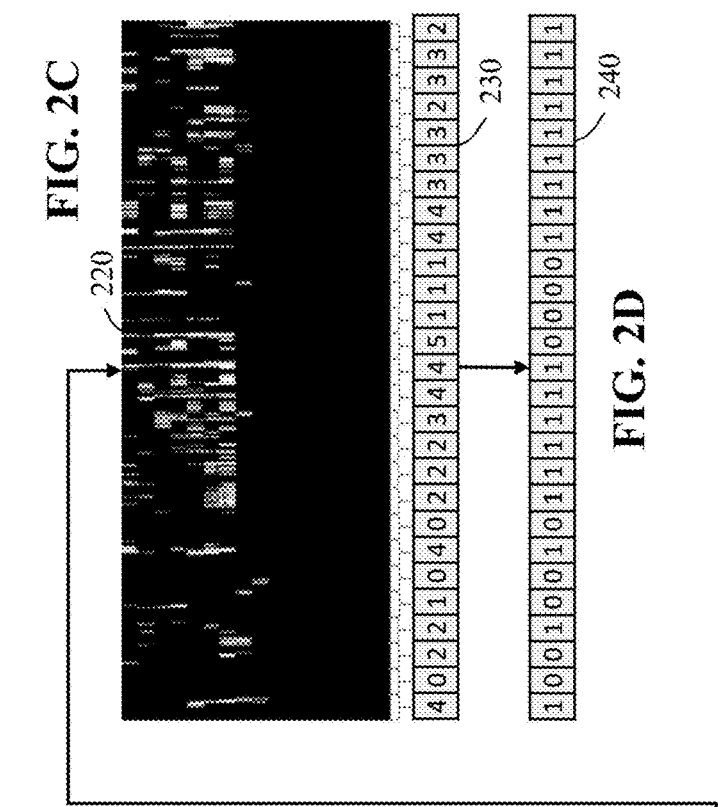
FIG. 2C
FIG. 2D
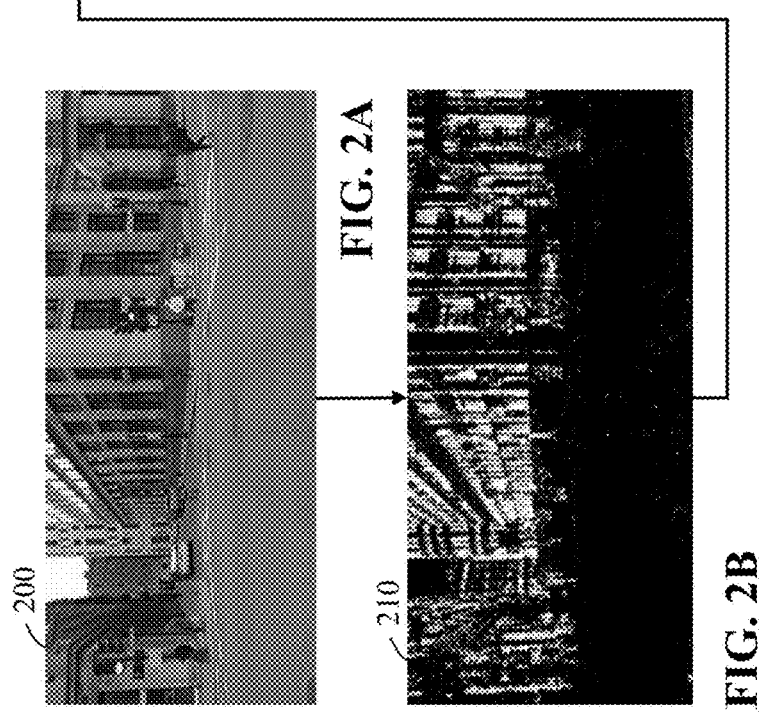
FIG. 2A
FIG. 2B

BARCODE: GLOBAL BINARY PATTERNS FOR FAST VISUAL INFERENCE

FIELD

The present disclosure relates generally to computer vision, and more particularly to using binary descriptors for generating fast inference methods in the context of autonomous driving applications.

BACKGROUND

Global positioning systems (GPS) are used to identify a location of a vehicle. For example, reporting a position of a moving car (localization) is traditionally a task that is solved by using GPS. Further, GPS is a space-based radio-navigation system consisting of a constellation of satellites and a network of ground stations used for monitoring and control. The GPS provides geolocation and time information to a GPS receiver anywhere on or near the Earth where there is an unobstructed line of sight to four or more GPS satellites. The GPS system does not require the user to transmit any data, and it operates independently of any telephonic or internet reception, though these technologies can enhance the usefulness of the GPS positioning information. However, GPS units suffer from drift as a result of accumulation or compounding of errors. Additionally, because GPS requires an unobstructed view to GPS satellites, poor weather conditions, mountainous areas, city or urban areas, can cause pose challenges to determining a location or a position of a vehicle, or in trying to identify a vehicle localization.

Therefore, a need exists in the art for an improved way to detect and/or identify locations other than using GPS.

SUMMARY

Embodiments of the present disclosure are directed to providing a visual feature description for fast inference methods in the context of autonomous driving applications, such as determining location and orientation of a moving vehicle.

The present disclosure is based on the recognition that for fast inference methods providing visual feature description in the context of autonomous driving applications, we can create an image descriptor that is binary and can consider only vertical structures of the scenes in the urban environment. Specifically, the number of vertical lines can be the basis of the descriptor. For example, the present disclosure uses a histogram of vertical lines in adjacent locations to build a binary vector that encodes the presence and absence of vertical lines in different angular segments from a camera center. Wherein this descriptor can be extracted at very high speed and is highly informative to provide location information. The method relies on the distribution of vertical lines that are typical in urban canyons with buildings, where GPS is known to be error-prone.

In other words, the basic aspect of a global image descriptor is to construct a small feature or a vector that captures all the important components of an image. By using the small feature, the present disclosure is able to identify an image obtained from a location with respect to an image obtained in another location. The present disclosure builds image descriptors using binary values (0 and 1 only), instead of real numbers, wherein the feature descriptor is for the entire image. Such a binary descriptor is not only compact but also efficient to compute, especially for special hardware such as ASIC and FPGA that might not support arithmetic operators on real numbers. The present disclosure uses a histogram of vertical lines in adjacent locations to build a binary vector that encodes the presence and absence of vertical lines in different angular segments from a camera center. The present disclosure performance provides for a descriptor that can be extracted at very high speed and this descriptor is highly informative to provide location information. Our method relies on the distribution of vertical lines that are typical in urban canyons with buildings, where GPS is known to be error-prone.

Note that our method relies only on line segments, which are less sensitive to lighting variations as is conventionally used. The basic idea of image-based localization is the following. Each input image in the sequence is converted into a binary representation or barcode. Wherein the present disclosure compares the Barcode of the query image with that of the images in the database using Hamming distance. The location of the query image can be seen as approximately the location of the closest image in the database. For turn-classification, the present disclosure uses a neural network where the input is a binary matrix obtained by stacking the Barcodes from a few consecutive image frames.

In coining to our realizations, the present disclosure recognized that localization is a key capability for autonomous ground vehicles, and other industry applications, and is typically performed using a combination of GPS sensing, wheel odometry (from joint encoders) and inertial sensing (gyroscopes and accelerometers). However, the present disclosure found at least two limitations to using GPS, for example, GPS can be inaccurate in urban environments, inertial sensors are prone to drift, and wheel odometry is unreliable in some terrains (wheels tend to slip and sink).

In order to come to our realization, many experiments were carried out with many different types of approaches and applications. For example, an experiment using wide-baseline matching for localization purposes was done. Wherein, millions of GPS-tagged images from the Internet (web) were used and then matching the query image using a wide variety of different types of image features. Some of the different types of image features included color and text on histograms, line features, gist descriptor, and geometric context (labeling of the image pixels into sky, vertical and ground). Other experiments included another approach using a bag-of-words representation that aggregates local descriptors into a global descriptor for large-scale image search. However, for the above mentioned approaches the present disclosure discovered many problems. For example, the feature vectors are not adapted to the specific task on hand, regarding the localization and orientation in the urban environment. Further, both approaches also have another common problem, which is, that currently used feature vectors are too large for fast comparison, requiring expensive computer time and computation. In other words, using GPS, and any of the above mentioned approaches, i.e. a wide-baseline matching for localization approach or bag-of-words representation approach, did not fit the present disclosure criteria due to requiring expensive computer time and computation. Further, using GPS, and any of the above mentioned approaches, could not be used for today's technological applications, due to poor time related performance required in providing visual feature description for fast inference methods in the context of autonomous driving applications.

Based on our experimentation, we came to the realization that using visual odometry provides many benefits. For example, visual odometry estimates vehicle motion from a sequence of camera images, offers a natural complement to these types of sensors, is insensitive to soil mechanics, produces a full 6DOF motion estimate, and has lower drift rates than all but the most expensive Inertial Measurement Units (IMUs).

As noted above, our realization includes creating a global image descriptor, or Barcode, that considers only vertical structure of the scenes in the urban environment. Specifically, the number of vertical lines is the basis of the descriptor, wherein the present disclosure captures an image from a vehicle-mounted camera. Such that, the binary descriptor of the present disclosure is capable of describing the image using 128 bits.

The present disclosure relies only on line segments, which are less sensitive to lighting variations. For example, the basic idea of image-based localization of the present disclosure includes comparing the Barcode of the query image with that of the images in the database using Hamming distance. The location of the query image can be seen as approximately the location of the closest image in the database. For example, the present disclosure solved for the localization as finding a location of a vehicle by matching an image with a database of GPS-tagged images. Specifically, embodiments of the present disclosure find the best match for the query binary descriptor from a database of binary descriptors associated with thousands of images. Based on the matching, the present disclosure identifies the location on a driving trajectory.

For turn-classification the present disclosure uses a neural network where the input is a binary matrix obtained by stacking the Barcodes from a few consecutive image frames. By turn-classification, the present disclosure refers to the problem of computing whether an on-road vehicle makes a left or right turn. During experimenting with visual odometry, there can be a specific problem when using visual odometry, where one computes six degrees of camera motion (three for rotation and three translational) from an image pair. To overcome these problems, the present disclosure uses neural networks for the turn-classification.

The imaging system of the present disclosure can provide solutions in transforming an image in a histogram indicating a number of vertical edges at each bin of an image, and threshold the histogram to produce a binary representation of the image. Wherein the image Barcode or image Barcodes, are fast to compute and can be used for visual odometry. Further, the image barcodes can be used to train neural network. Further still, the image barcodes can be complemented with depth values. We also note our image-based localization may be used as a complementary method to GPS. For example, the Barcode may be used for providing quick and high-level feedback in the context of autonomous driving applications, wherein the Barcode can be used for localization and turn-classification with negligible computational cost.

Aspects of the present disclosure include that the imaging system can be implemented with systems extending 3D (XYZ) reconstruction to 4D (XYZt) reconstruction for handling dynamic objects. Further, aspects of the present disclosure contemplate the imaging system can be utilized having different illumination conditions (day/night). Further still, aspects of the present disclosure contemplate the imaging system can be incorporated with fast reconstruction algorithms using dynamic vision sensors. Further still, edge-based, i.e. DVS-Style, 3D Modeling systems, i.e. DVS-based localization for uncontrolled outdoor scenes. Further, the present disclosure imaging system may be incorporated with warehouse robot navigation and outdoor factor plant monitoring systems.

At least some applications of the imaging system of the present disclosure may be incorporate with systems such as outdoor car parking space systems, outdoor car street systems, water plant systems and large indoor airport systems, factory systems. Further, it is contemplated the present disclosure can operate using images of scenes under different illumination conditions using monocular and stereo cameras.

According to an embodiment of the present disclosure, an imaging system having a memory with stored reference imaging data including a historical localization dictionary database that includes geo-located driving image sequences, such that each reference image is applied to a threshold to produce a binary representation. The imaging system includes a sensor to acquire a sequence of input images of a dynamic scene. An encoder to determine, for each input image in the sequence, a histogram of each input image in the sequence indicating a number of vertical edges at each bin of the input image and to threshold the histogram to produce a binary representation of the input image. A visual odometer to compare the binary representations of each input image in the sequence and each reference image in the database, by matching one or more input image against one or more reference image in the database. Wherein the visual odometer determines a location of the input image based on a match between the one or more input image and the one or more reference image.

According to another embodiment of the present disclosure, an imaging system, the imaging system having a memory with stored reference imaging data that includes a historical localization dictionary database having a sequence of reference images, such that each reference image is applied to a threshold to produce a binary representation. The imaging system including a sensor to acquire a sequence of input images of a dynamic scene. An encoder to determine, for each input image in the sequence, a histogram of each input image in the sequence indicating a number of vertical edges at each bin of the input image and to threshold the histogram to produce a binary representation of the input image. A visual odometer to compare the binary representations of each input image in the sequence and each reference image in the database, by associating the input image with a corresponding reference image in the database, to identify an associated location of the input image. Finally, an output interface of the encoder outputs the identified associated location of each input image or stores the identified associated location of each input image in the memory.

According to another embodiment of the present disclosure, an imaging system to detect a location of a vehicle while the vehicle is moving. The imaging system having a memory with stored imaging data that includes a historical localization dictionary database having a sequence of images, such that each image is applied to a threshold to produce a binary representation. The imaging system including a sensor mounted to the vehicle to acquire a sequence of input images of a dynamic scene. An encoder to determine, for each input image in the sequence, a histogram of each input image in the sequence indicating a number of vertical edges at each bin of the input image and to threshold the histogram to produce a binary representation of the input image. A visual odometer to compare the binary representations of each input image in the sequence and each image in the database, by associating the input image with a corresponding image in the database, to identify an associated location of the input image. Finally, an output interface of the encoder outputs the identified associated location of each input image or stores the identified associated location of each input image in the memory.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIGS. 2A, 2B, 2C, and 2D are photos of images showing different stages of a process of extracting binary descriptors from a given image, according to some embodiments of the present disclosure;

Figure 1A:
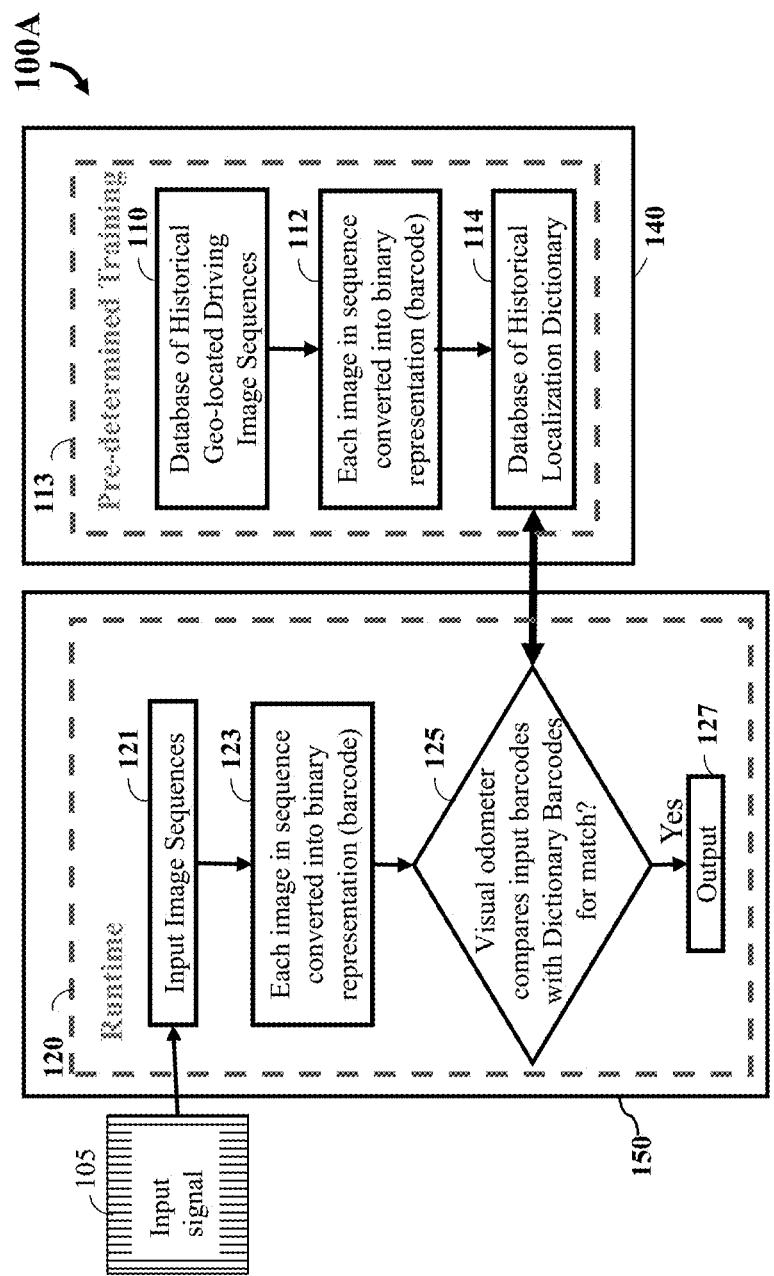
FIG. 1A is a block diagram illustrating an imaging system, according to an embodiment of the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Overview

Embodiments of present disclosure are directed to providing a visual feature description for fast inference methods in the context of autonomous driving applications for determining location and orientation of a moving vehicle.

The present disclosure is based on the recognition that an image descriptor can be binary and can also consider only vertical structures of the scenes in the urban environment. Specifically, the number of vertical lines can be the basis of the descriptor. For example, using a histogram of vertical lines in adjacent locations to build a binary vector that encodes the presence and absence of vertical lines in different angular segments from a camera center. Wherein this descriptor can be extracted at very high speed and is highly informative to provide location information. The method relies on the distribution of vertical lines that are typical in urban canyons with buildings, where GPS is known to be error-prone.

Based on our experimentation we came to the realization that using visual odometry offers many advantages For example, visual odometry estimates vehicle motion from a sequence of camera images, offers a natural complement to these types of sensors, is insensitive to soil mechanics, produces a full 6DOF motion estimate, and has lower drift rates than all but the most expensive Inertial Measurement Units (IMUs).

As noted above, our realization includes creating a global image descriptor, or Barcode, that considers only vertical structures of the scenes in the urban environment. Specifically, the number of vertical lines is the basis of the descriptor, wherein the present disclosure captures an image from a vehicle-mounted camera. Such that, the binary descriptor of the present disclosure is capable of describing the image using 128 bits.

The present disclosure relies only on line segments, which are less sensitive to lighting variations. For example, the basic idea of our image-based localization includes comparing the Barcode of the query image with that of the images in the database using Hamming distance. The location of the query image can be seen as approximately the location of the closest image in the database. For example, solving for the localization includes finding a location of a vehicle by matching an image with a database of GPS-tagged images. Specifically, identifying the best match for the query binary descriptor from a database of binary descriptors associated with thousands of images. Based on the matching, the location is identified on a driving trajectory.

For turn-classification the present disclosure uses a neural network where the input is a binary matrix obtained by stacking the Barcodes from a few consecutive image frames. By turn-classification, the present disclosure refers to the problem of computing whether an on-road vehicle makes a left or right turn. During experimenting with visual odometry a specific problem was identified when using visual odometry, where one computes six degrees of camera motion (three for rotation and three translational) from an image pair. To overcome these problems, the present disclosure uses neural networks for the turn-classification.

At least one imaging system of the present disclosure provides solutions in transforming an image in a histogram indicating a number of vertical edges at each bin of an image, and thresholds the histogram to produce a binary representation of the image. Wherein the image Barcode(s) are fast to compute and can be used for visual odometry. Further, the image barcodes can be used to train neural networks. Further still, the image barcodes can be complemented with depth values. Also our image-based localization may be used as a complementary method to GPS. For example, the Barcode may be used for providing quick and high-level feedback in the context of autonomous driving applications, wherein the present disclosure can use the Barcode for localization and turn-classification with negligible computational cost.

FIGS. 1A-1D refer to an imaging system 100A illustrating a process of a localization method, according to the present disclosure. For example, FIG. 1A is a block diagram illustrating an imaging system, according to an embodiment of the present disclosure. Referring to FIG. 1A, the imaging system 100A works in two aspects: preprocessing or predetermined training 113 and runtime 120. The input to the preprocessing step 113 that is stored in a memory 140, is a sequence of reference images 110 from a camera (not shown) captured during a previous driving session. Each reference image is associated with location information (GPS coordinates). The reference image sequences are converted into Barcodes 112 and stored in a database of historical localization dictionary 114, that includes a hierarchical data structure for fast indexing.

During the runtime step 120 implemented using at least one processor 150, an image from an input signal 105, is converted into the Barcode 123 and using a visual odometer 125, queried to the pre-calculated dictionary or database 114. In particular, the visual odometer 125 compares input barcodes of one or more input images with one or more reference images of the database 114 for matching. If the input image is present, then the location is reported or outputted 127.

Figure 1B:
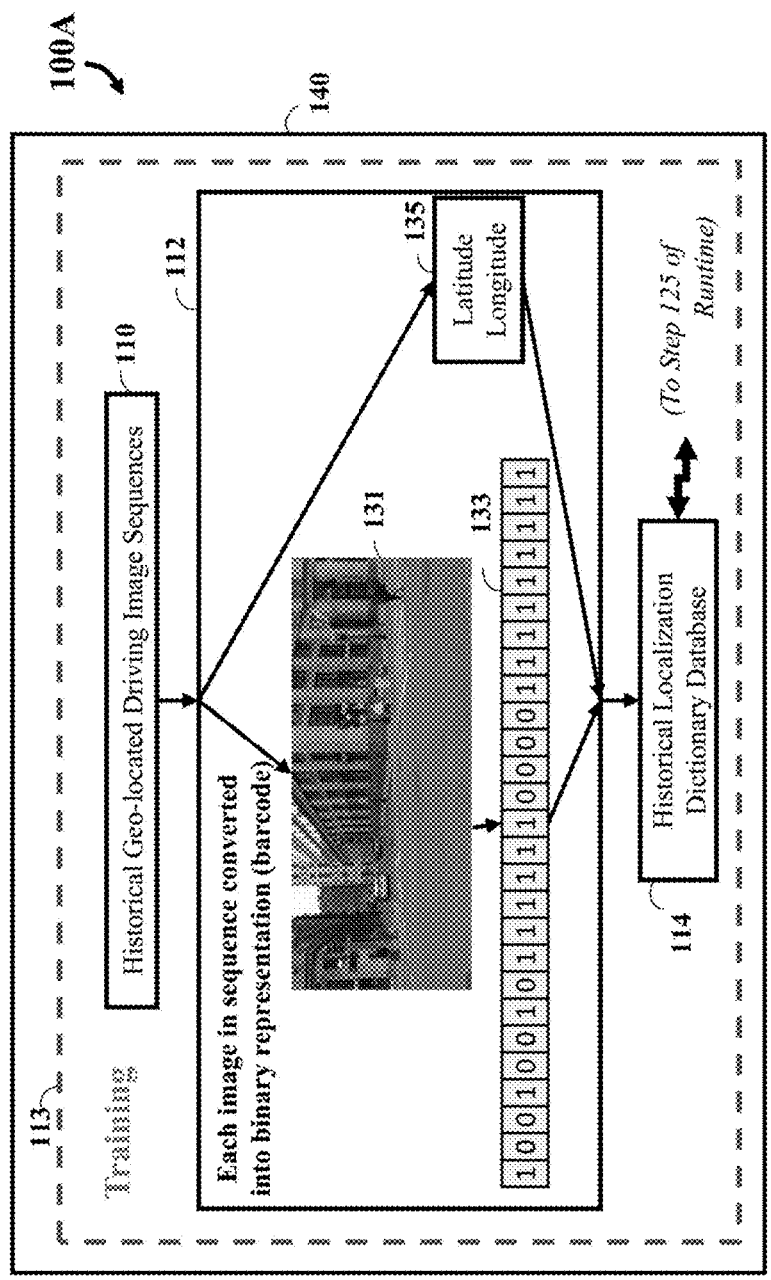
FIG. 1B is a block diagram illustrating the imaging system of FIG. 1A that provides more detail of training, regarding each input image in the sequence being converted into binary representation (barcode), according some embodiments of the present disclosure.

FIG. 1B is a block diagram illustrating the imaging system of FIG. 1A that provides more detail of training, regarding each input image in the sequence being converted into binary representation (barcode), according some embodiments of the present disclosure. Specifically, regarding training 113, step 112 is further disclosed. In the geo-located driving image sequence 110, each image 131 is associated with the geographical location, namely latitude and longitude 135, when the image 131 is captured. Once the image 131 is converted into the binary value representation BarCode 133, both the BarCode 133 and the geographical location 135 are stored to the database 114.

Figure 1C:
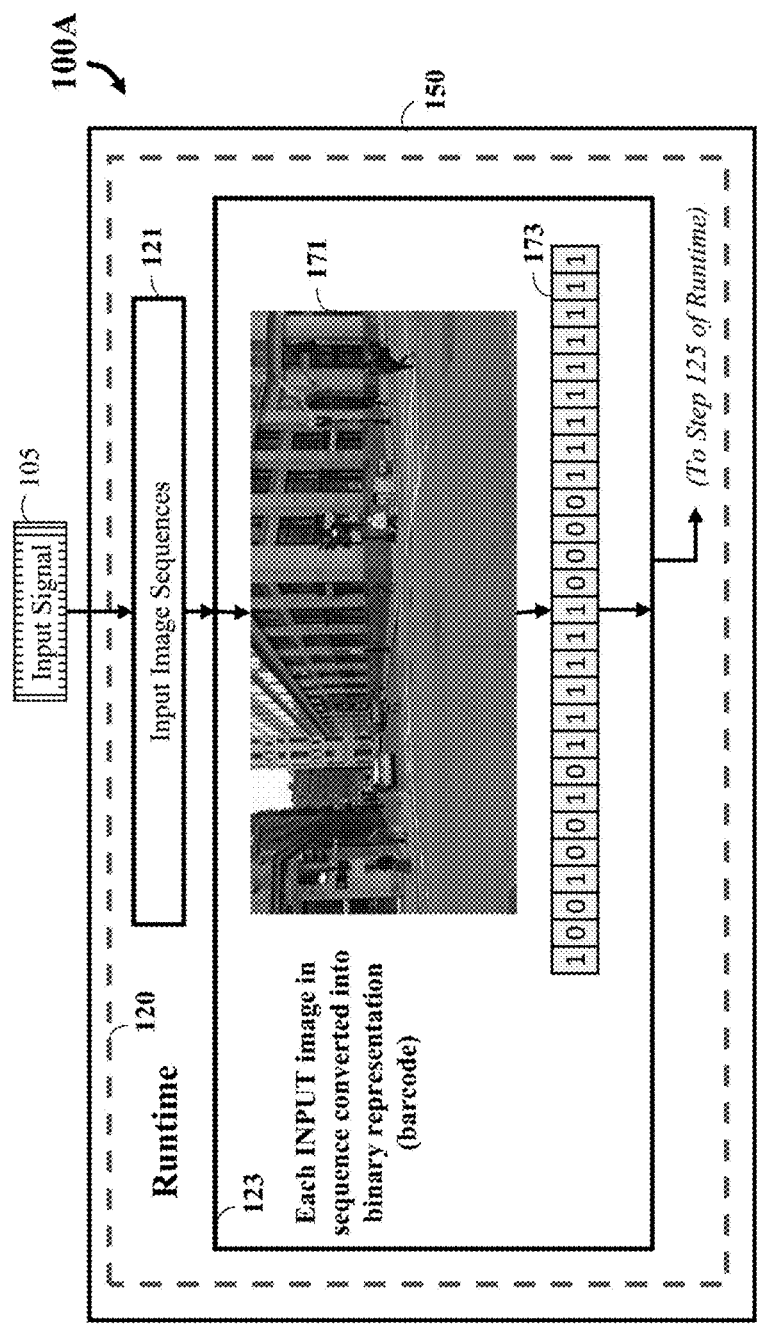
FIG. 1C is a block diagram illustrating the imaging system of FIG. 1A that provides more detail regarding runtime, for each reference image in the sequence being converted into binary representation (barcode), according some embodiments of the present disclosure.

FIG. 1C illustrates is a block diagram illustrating the imaging system of FIG. 1A that provides more detail regarding runtime, for each reference image in the sequence being converted into binary representation (barcode), according some embodiments of the present disclosure. Specifically, regarding runtime 120, step 123 is further disclosed. For each image 171 in the input image sequence 121, its converted to the BarCode 173.

Figure 1D:
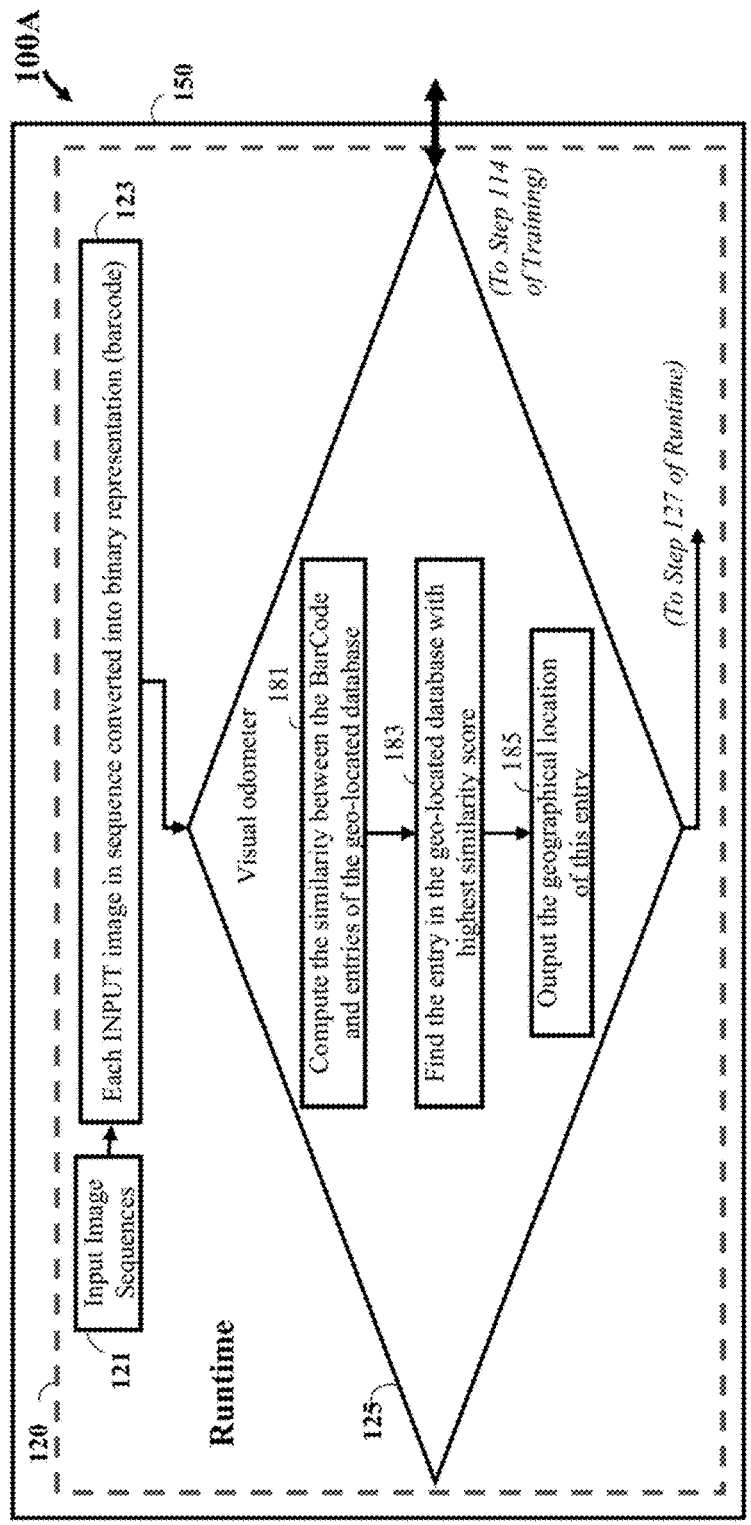
FIG. 1D is a block diagram illustrating the imaging system of FIG. 1A that provides more detail regarding runtine for the visual odometer comparing input barcodes with reference or Dictionary Barcodes for a match, according some embodiments of the present disclosure.

FIG. 1D illustrates is a block diagram illustrating the imaging system of FIG. 1A that provides more detail regarding runtime for the visual odometer comparing input barcodes with reference or Dictionary Barcodes for a match, according some embodiments of the present disclosure. Specifically, regarding runtime 120, step 125 is further disclosed Given the BarCode generated by step 123, the BarCode is compared with every entry in the database generated by step 114. For each entry, a similarity score between it and the BarCode is computed, as step 181. Then step 183 selects the entry with highest similarity score, and steps 185 outputs the geological location of this entry.

Figure 1E:
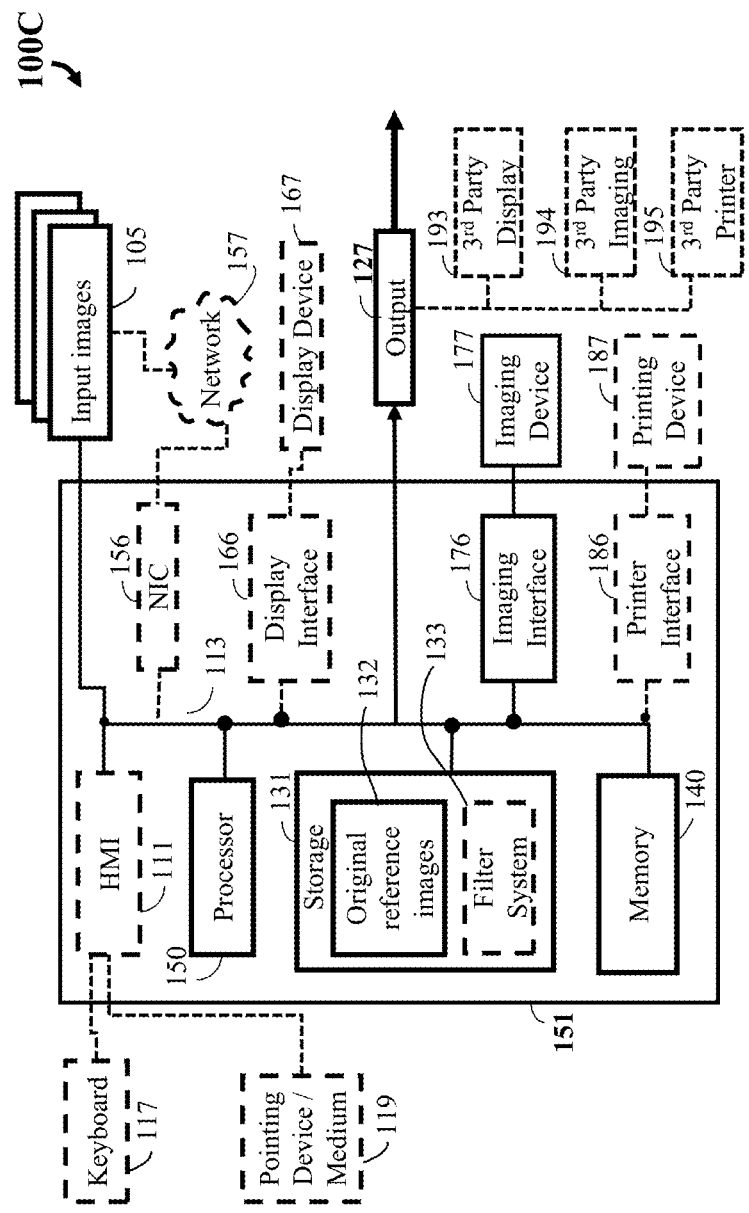
FIG. 1E a block diagram illustrating a computer system that can be utilized for the imaging system of FIG. 1A, according some embodiments of the present disclosure.

FIG. 1E a block diagram illustrating a computer system 100C that can be utilized for the imaging system of FIG. 1A, according some embodiments of the present disclosure. For example, FIG. 1E shows a processor 150 connected to bus 113 configured to execute stored instructions, as well as memory 140 that stores instructions that are executable by the processor 150. Further, the system 100C can include an imaging interface 176 in communication with an imaging device 177 connected to bus 113. A storage unit 131 can include the original sequence of reference images 132 and optionally a filter system 133.

Optionally, system 100C can include a keyboard 117 and pointing device/medium 119 connected to a Human Machine Interface 111 connected to bus 113. Also optionally, the system 100C can include a display interface 166 in communication with a display device 167 connected to bus 113. Further still, the system 100C can optionally include a printer interface 186 in communication with a printing device 187 connected to bus 113. A network interface controller (NIC) 156 can optionally be adapted to connect through the bus 113 to a network 157. The output 127 may include imaging data or other data, among other things, that can be rendered to a third party display device 193, a third party imaging device 194, and/or a third party printing device 195 outside of the computer 151.

FIGS. 2A, 2B, 2C, and 2D are photos showing different stages of a process of extracting binary descriptors from a given image, according to some embodiments of the present disclosure. For example, FIG. 2A illustrates a given image 200, wherein FIG. 2B illustrates the result after applying the vertical edge detector. Here brighter color means higher response. FIG. 2C illustrates the result after applying a threshold to the edge response of FIG. 2B such that the response higher than the threshold are marked as 1 (white) or 0 (black) otherwise, then divide the image columns into groups. Each group is marked by a bracket beneath 220. Within each group, the number of pixels with edge response higher than the threshold is counted, as denoted in 230. Once the counters of all groups are collected, as the array of 230, threshold the counters in 230 to form the binary vector BarCode. For instance, in FIG. 2D, with 1 as the threshold, the array 230 can be converted into the binary array 240.

Figure 3:
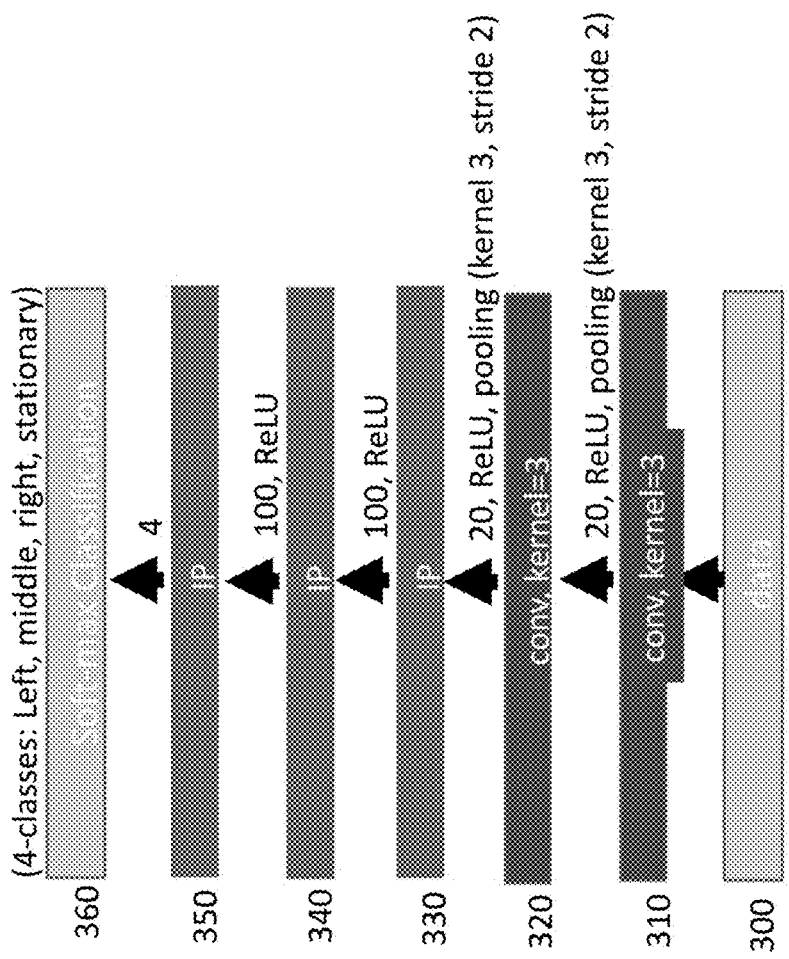
FIG. 3 is a schematic illustrating details of the deep neural network that is used for the task of turn-classification 360 with four output classes (stationary, straight, left-turn and right-turn), according to some embodiments of the present disclosure.

FIG. 3 is a schematic illustrating details of the deep neural network that is used for the task of turn-classification 360 with four output classes (stationary, straight, left-turn and right-turn), according to some embodiments of the present disclosure. For example, FIG. 3 provides the details of the deep neural network that is used for the task of turn-classification 360 with four output classes (stationary, straight, left-turn and right-turn). The input data 300 is passed to two convolutional layers 310 and 320. The parameter settings for kernels, ReLU, and the pooling are shown. Following the two convolution layers, use three fully connected layers 330, 340, and 350 with a different number of outputs. In the final layer, use a soft-max to obtain the classification 360 for turns.

Figure 4:
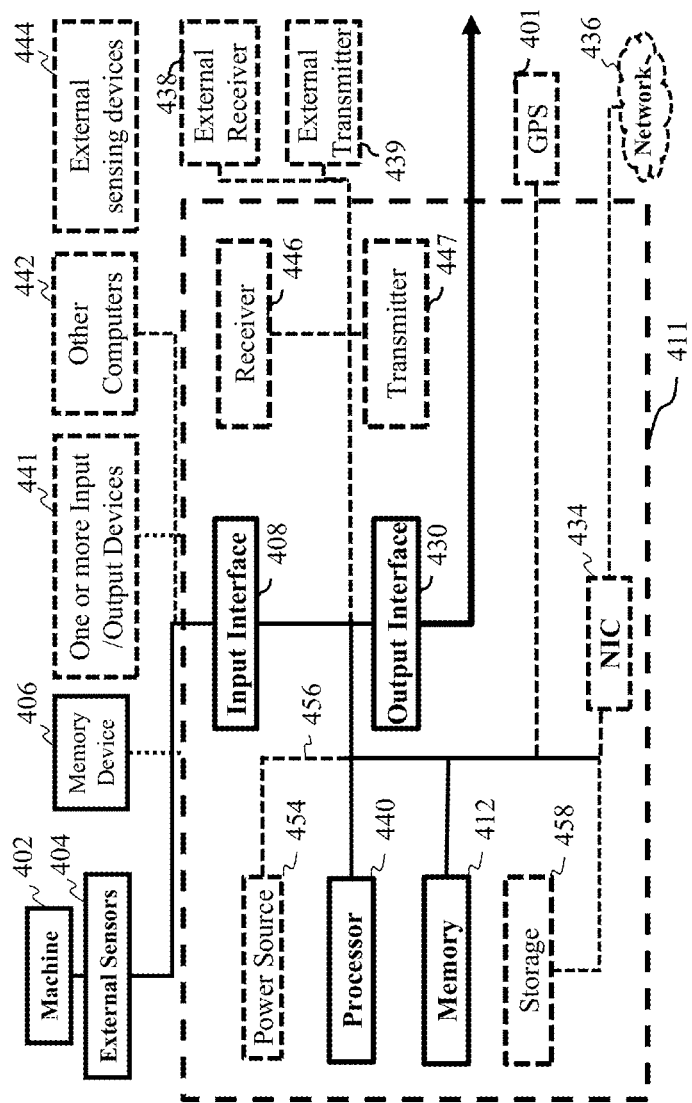
FIG. 4 is a schematic of an operation of an encoder, according to embodiments of the present disclosure.

FIG. 4 is a block diagram of illustrating an alternate computer or processor of an encoder for the method of FIG. 1A, according to embodiments of the present disclosure. The encoder 411 includes a processor 440, computer readable memory 412, storage 458 and user interface 449 with display 452 and keyboard 451, which are connected through bus 456. For example, the user interface 449 in communication with the processor 440 and the computer readable memory 412, acquires and stores the data in the computer readable memory 412 upon receiving an input from a surface, keyboard surface, of the user interface 457 by a user.

Contemplated is that the memory 412 can store instructions that are executable by the processor, historical data, and any data to that can be utilized by the methods and systems of the present disclosure. The processor 440 can be a single core processor, a multi-core processor, a computing cluster, or any number of other configurations. The processor 440 can be connected through a bus 456 to one or more input and output devices. The memory 412 can include random access memory (RAM), read only memory (ROM), flash memory, or any other suitable memory systems.

Still referring to FIG. 4, a storage device 458 can be adapted to store supplementary data and/or software modules used by the processor. For example, the storage device 458 can store historical data and other related data as mentioned above regarding the present disclosure. Additionally, or alternatively, the storage device 458 can store historical data similar to data as mentioned above regarding the present disclosure. The storage device 458 can include a hard drive, an optical drive, a thumb-drive, an array of drives, or any combinations thereof.

The system can be linked through the bus 456 optionally to a display interface (not shown) adapted to connect the system to a display device (not shown), wherein the display device can include a computer monitor, camera, television, projector, or mobile device, among others.

The encoder 411 can include a power source 454, depending upon the application the power source 454 may be optionally located outside of the encoder 411.

Still referring to FIG. 4, a network interface controller (NIC) 434 can be adapted to connect through the bus 456 to a network 436, so data or other data, among other things, and/or stored within the storage system 458 for storage and/or further processing. Further, the data or other data may be received wirelessly or hard wired from a receiver 446 (or external receiver 438) or transmitted via a transmitter 447 (or external transmitter 439) wirelessly or hard wired, the receiver 446 and transmitter 447 are both connected through the bus 456. Further, a GPS 401 may be connected via bus 456 to the encoder 411. The encoder 411 may be connected via an input interface 408 to external sensing devices 444 and external input/output devices 441. The encoder 411 may be connected to other external computers 442. An output interface 409 may be used to output the processed data from the processor 440.

Figure 5:
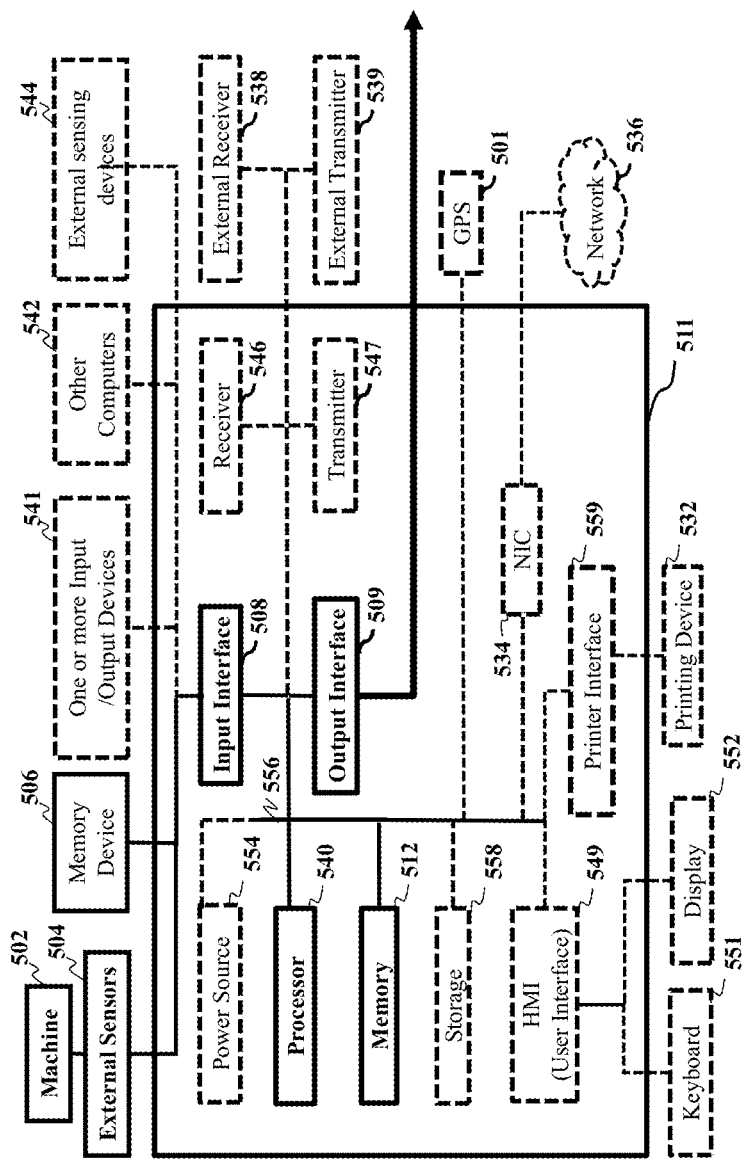
FIG. 5 is a block diagram of illustrating the method of FIG. 1A, that can be implemented using an alternate computer or processor, according to embodiments of the present disclosure.

FIG. 5 is a block diagram of illustrating the method of FIG. 1A, that can be implemented using an alternate computer or processor, according to embodiments of the present disclosure. The computer 511 includes a processor 540, computer readable memory 512, storage 558 and user interface 549 with display 552 and keyboard 551, which are connected through bus 556. For example, the user interface 549 in communication with the processor 540 and the computer readable memory 512, acquires and stores the measuring data in the computer readable memory 512 upon receiving an input from a surface, keyboard surface, of the user interface 557 by a user.

Contemplated is that the memory 512 can store instructions that are executable by the processor, historical data, and any data to that can be utilized by the methods and systems of the present disclosure. The processor 540 can be a single core processor, a multi-core processor, a computing cluster, or any number of other configurations. The processor 540 can be connected through a bus 556 to one or more input and output devices. The memory 512 can include random access memory (RAM), read only memory (ROM), flash memory, or any other suitable memory systems.

Still referring to FIG. 5, a storage device 558 can be adapted to store supplementary data and/or software modules used by the processor. For example, the storage device 558 can store historical device data and other related device data such as manuals for the devices, wherein the devices are sensing device capable of obtaining measured data as mentioned above regarding the present disclosure. Additionally, or alternatively, the storage device 558 can store historical data similar to the measuring data. The storage device 558 can include a hard drive, an optical drive, a thumb-drive, an array of drives, or any combinations thereof.

The system can be linked through the bus 556 optionally to a display interface (not shown) adapted to connect the system to a display device (not shown), wherein the display device can include a computer monitor, camera, television, projector, or mobile device, among others.

The computer 511 can include a power source 554, depending upon the application the power source 554 may be optionally located outside of the computer 511. A printer interface 559 can also be connected through bus 556 and adapted to connect to a printing device 532, wherein the printing device 532 can include a liquid inkjet printer, solid ink printer, large-scale commercial printer, thermal printer, UV printer, or dye-sublimation printer, among others. A network interface controller (NIC) 534 is adapted to connect through the bus 556 to a network 536, wherein measuring data or other data, among other things, can be rendered on a third party display device, third party imaging device, and/or third party printing device outside of the computer 511.

Still referring to FIG. 5, the measuring data or other data, among other things, can be transmitted over a communication channel of the network 536, and/or stored within the storage system 558 for storage and/or further processing. Further, the measuring data or other data may be received wirelessly or hard wired from a receiver 546 (or external receiver 538) or transmitted via a transmitter 547 (or external transmitter 539) wirelessly or hard wired, the receiver 546 and transmitter 547 are both connected through the bus 556. The computer 511 may be connected via an input interface 508 to external sensing devices 544 and external input/output devices 541. The computer 511 may be connected to other external computers 542. An output interface 509 may be used to output the processed data from the processor 540.

The above-described embodiments of the present disclosure can be implemented in any of numerous ways. For example, the embodiments may be implemented using hardware, software or a combination thereof. Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. An imaging system having a memory with stored thereon executable instructions, and stored reference imaging data including a historical localization dictionary database having geo-located driving image sequences and other features acting as signatures for distinct locations, such that each reference image is applied to a threshold to produce a binary representation, the imaging system comprising:
   a sensor to acquire a sequence of input images of a dynamic scene;
   an encoder to determine, for each input image in the sequence, a histogram of each input image in the sequence indicating a number of vertical edges at each bin of the input image and to threshold the histogram to produce a binary representation of the input image; and
   a visual odometer to compare the binary representations of each input image in the sequence and each reference image in the database, by matching one or more input image against one or more reference image in the database,
   wherein the visual odometer determines a location of the input image based on a match between the one or more input image and the one or more reference image.

2. The imaging system of claim 1, wherein the state of the imaging system includes the location and an orientation of the imaging system.

3. The imaging system of claim 2, wherein the orientation of the imaging system includes a turn-classification algorithm that uses the binary representations of consecutive input images in the sequence in a neural network, such that an input to the neural network is a binary matrix obtained by stacking the binary representations of consecutive input images in the sequence from consecutive images.

4. The imaging system of claim 1, wherein the visual odometer tracks the change in the state of the imaging system using a neural network.

5. The imaging system of claim 4, wherein the neural network, for each control step, receives as an input the binary representations of at least some images concatenated in a tensor to produce the change in the state of the imaging system.

6. The imaging system of claim 4, wherein the neural network, for each control step, receives as an input the binary representations of the sequence of images determined for each bin of each binary representation.

7. The imaging system of claim 1, wherein the visual odometer uses a hamming distance approach to compare the binary representations of each input image in the sequence and each image in the database.

8. The imaging system of claim 1, wherein the encoder filters one or more of the vertical edges at each bin of the input image, such that a strength of the vertical images of each pixel is measured as a magnitude of a difference of a gradient along a horizontal and a vertical direction.

9. The imaging system of claim 1, wherein the imaging system is in communication with a vehicle control system, a vehicle parking system, a vehicle navigation system, etc.

10. An imaging system, the imaging system having a memory with stored reference imaging data including a historical localization dictionary database, the database having a sequence of reference images, such that each reference image is applied to a threshold to produce a binary representation, comprising:
    a sensor to acquire a sequence of input images of a dynamic scene;
    an encoder to determine, for each input image in the sequence, a histogram of each input image in the sequence indicating a number of vertical edges at each bin of the input image and to threshold the histogram to produce a binary representation of the input image;
    a visual odometer to compare the binary representations of each input image in the sequence and each reference image in the database, by associating the input image with a corresponding reference image in the database, to identify an associated location of the input image; and
    an output interface of the encoder outputs the identified associated location of each input image or stores the identified associated location of each input image in the memory.

11. The imaging system of claim 10, wherein the visual odometer tracks the change in the state of the imaging system using a neural network.

12. The imaging system of claim 11, wherein the visual odometer tracks the change in the state of the imaging system using a neural network, such that the neural network, for each control step, receives as an input the binary representations of at least 100 images concatenated in a tensor to produce the change in the state of the imaging system.

13. The imaging system of claim 11, wherein the neural network, for each control step, receives as an input the binary representations of the sequence of images combined with depth values determined for each bin of each binary representation.

14. The imaging system of claim 10, wherein the visual odometer uses a hamming distance approach to compare the binary representations of each input image in the sequence and each reference image in the database.

15. An imaging system to detect a location of a vehicle while the vehicle is moving, the imaging system having a memory with stored imaging data that includes a historical localization dictionary database having a sequence of images, such that each image is applied to a threshold to produce a binary representation, comprising:
- a sensor mounted to the vehicle to acquire a sequence of input images of a dynamic scene;
- an encoder to determine, for each input image in the sequence, a histogram of each input image in the sequence indicating a number of vertical edges at each bin of the input image and to threshold the histogram to produce a binary representation of the input image;
- a visual odometer to compare the binary representations of each input image in the sequence and each image in the database, by associating the input image with a corresponding image in the database, to identify an associated location of the input image; and
- an output interface of the encoder outputs the identified associated location of each input image or stores the identified associated location of each input image in the memory.

16. The imaging system of claim 15, wherein the threshold is based on one or more vertical line segments of each vertical edge being within or out of a vertical tolerance range.

17. The imaging system of claim 15, wherein the state of the imaging system includes the location and an orientation of the imaging system, such that the orientation of the imaging system includes a turn-classification algorithm, and the turn-classification algorithm uses the binary representations of consecutive input images in the sequence in a neural network, such that an input to the neural network is a binary matrix obtained by stacking the binary representations of consecutive input images in the sequence from consecutive images.

* * * * *